United States Patent
Smart et al.

(10) Patent No.: US 9,130,733 B2
(45) Date of Patent: Sep. 8, 2015

(54) ALIGNMENT OF NON-SYNCHRONOUS DATA STREAMS

(75) Inventors: Robert Patrick Wallace Smart, Stevenage (GB); Daniel Christopher Hollamby, Stevenage (GB); Adrian Philip Baldwin, Stevenage (GB); Iain David Cameron, Stevenage (GB)

(73) Assignee: Airbus Defence and Space Limited, Stevenage Hertfordshire (GB)

( * ) Notice: Subject to any disclaimer, the term of this patent is extended or adjusted under 35 U.S.C. 154(b) by 0 days.

(21) Appl. No.: 14/125,050

(22) PCT Filed: Jun. 7, 2012

(86) PCT No.: PCT/EP2012/060828
§ 371 (c)(1),
(2), (4) Date: Mar. 14, 2014

(87) PCT Pub. No.: WO2012/168383
PCT Pub. Date: Dec. 13, 2012

(65) Prior Publication Data
US 2014/0192939 A1    Jul. 10, 2014

(30) Foreign Application Priority Data
Jun. 10, 2011  (EP) .................................... 11275094

(51) Int. Cl.
*H04L 7/00* (2006.01)
*H04L 7/02* (2006.01)
*H04L 25/14* (2006.01)

(52) U.S. Cl.
CPC . *H04L 7/02* (2013.01); *H04L 25/14* (2013.01)

(58) Field of Classification Search
CPC ....... H04L 27/02; H04L 7/008; H04L 7/0331; H04L 7/0337; H04L 7/033; H04L 25/14
USPC ......... 375/130, 243, 259, 260, 285, 346, 354, 375/355
See application file for complete search history.

(56) References Cited

U.S. PATENT DOCUMENTS 7,295,639 B1   11/2007 Cory
7,454,537 B1   11/2008 Xue
(Continued)

OTHER PUBLICATIONS

Notification of Transmittal of International Search Report and the Written Opinion of the International Searching Authority, PCT/EP2012/060828, date of mail Sep. 20, 2012.

*Primary Examiner* — Syed Haider
(74) *Attorney, Agent, or Firm* — Hamilton, Brook, Smith & Reynolds, P.C.

(57) ABSTRACT

An apparatus for aligning non-synchronous input data streams received in the apparatus, the apparatus comprising an analog to digital converter arrangement for digitizing the data streams into a plurality of sequences of samples; and a synchronization processing arrangement for generating alignment pulses for each sequence of the plurality of sequences of samples, for arranging each sequence of samples with respect to the alignment pulses for the sequence and for synchronization the delivery of said plurality of sequences of samples to a common processor with respect to the respective alignment pulses. The synchronization processing arrangement may comprise a processing chain for each antenna feed of said plurality of antenna feeds and each processing chain may comprise an alignment pulse generator for generating an alignment pulse for the sequence of samples corresponding to the processing chain. The input data streams may be received by a plurality of antenna feeds.

13 Claims, 8 Drawing Sheets

(56) References Cited

U.S. PATENT DOCUMENTS

| | | |
|---|---|---|
| 7,486,752 B1 | 2/2009 | Kwasniewski |
| 2003/0021368 A1* | 1/2003 | Yoshizaki ................. 375/354 |
| 2005/0162552 A1* | 7/2005 | Xiu et al. ................. 348/521 |
| 2008/0205448 A1* | 8/2008 | Tanahashi ................. 370/474 |
| 2011/0019657 A1* | 1/2011 | Zaher ................. 370/342 |

* cited by examiner

ALIGNMENT OF NON-SYNCHRONOUS DATA STREAMS

This application is the U.S. National Stage of International Application No. PCT/EP2012/060828, filed Jun. 7, 2012, which designates the U.S., published in English, and claims priority under 35 U.S.C. §§119 or 365(c) to European Application No. 11275094.8, filed Jun. 10, 2011.

FIELD OF THE INVENTION

The invention relates to the synchronisation of data streams. More particularly, but not exclusively, it relates to the digital synchronisation of data streams received by different antenna feeds.

BACKGROUND OF THE INVENTION

Many data processing systems receive data in a plurality of separate data streams but process the data streams together. An example of such a system is a receive antenna of a satellite payload with beamforming capability. A digital processor may receive a plurality of separate data streams from a plurality of antenna feeds and may combine and process the data streams together to form the required beams. Each data stream may be delivered to the digital processor by a separate processing chain having a separate clock signal.

In conventional systems, data sampling rates and bandwidths are sufficiently low to allow processing needs to be satisfied by means of data sampling and subsequent processing using fully synchronous design techniques. This is possible because the timing uncertainties throughout the design can be kept sufficiently small, compared to the clock period, to meet the set-up and hold needs of digital circuitry.

There is an ongoing trend towards high sampling rates. Higher sampling rates can result in the timing uncertainties between the processing chains used for different data streams being larger than a sample period. For example, at sufficiently high sampling rates, the clock signal generation within the analogue to digital converters give rise to significant timing uncertainties compared to the sampling period. Moreover, timing uncertainties may also arise in clock dividers downstream in the processing chains. Not all components of the processing chains can operate at the high sampling rates and clock dividers therefore have to be used. The clock divider start-up phase ambiguity can also give rise to significant timing uncertainties compared to the sampling period. When the combined timing uncertainty becomes large compared to the sampling period, the data streams are not provided in a sufficiently coherent manner to the digital processor and errors arise when the data streams are combined and further processed.

The invention was made in this context.

SUMMARY OF THE INVENTION

According to the invention, there is provided an apparatus for facilitating the alignment of non-synchronous input data streams received in the apparatus, the apparatus comprising an analogue to digital converter arrangement for digitising the input data streams into a plurality of sequences of samples and a synchronisation processing arrangement for generating alignment pulses for each sequence, for arranging each sequence of samples with respect to the alignment pulses for the sequence and for synchronising the delivery of said plurality of sequences of samples to a common processor with respect to the respective alignment pulses.

The invention therefore allows the streams to be delivered such that they can be coherently processed in the common processor.

The data streams may be received by a plurality of antenna feeds.

The synchronisation processing arrangement may comprise a processing chain for each data stream and each processing chain may comprise an alignment pulse generator for generating the alignment pulses for the sequence of samples corresponding to the processing chain. Each processing chain may have a separate processing chain clock signal and each alignment pulse generator may be configured to generate an alignment pulse of the alignment pulses for the sequence at a time determined in accordance with a synchronisation pulse common to all processing chains, and received by each alignment pulse generator, and the processing chain clock signal of the respective processing chain.

The alignment pulses generated by the alignment pulse generators of the different processing chains do not have to coincide. The synchronisation processing arrangement ensures that the alignment pulses and the sample sequences are aligned when they are delivered to the digital common processor.

Each of said processing chain clock signals may have a rate that is N times slower than a sampling rate for the data stream and each processing chain may further comprise means for dividing each sequence of samples corresponding to a data stream into a plurality (N) sub-streams such that N samples are processed each cycle of the processing chain clock signal. Consequently, the invention allows the sequence of samples to be processed even though the components of the processing chain cannot operate at the high sampling rate.

The apparatus may further comprise means for adjusting the timing of an alignment pulse for a sequence of samples with respect to an earlier alignment pulse of the alignment pulses for the sequence of samples to move the pulse one or more cycles of the processing chain clock signal corresponding to steps of N samples of the sequence of samples in order to align the non-synchronous input data streams. Each alignment pulse generator may be operable to adjust the timing of an alignment pulse based on received control signals. The plurality of alignment pulses may be used to divide the sequence of samples into a plurality of frames where the alignment pulses form frame boundaries. Each processing chain may further comprise means for moving the sequence of samples with respect to an alignment pulse to further align the non-synchronous input data streams, the means for moving being configured to move the sequence of samples between 0 and N−1 samples with respect to the frame boundaries. The means for moving the sequence of samples may be a data selector that stores the latest N−1 samples of a current cycle and selects N samples from the next cycle and the current cycle to pass downstream in the processing chain in the next cycle. In other words, the data selector effectively moves the samples with respect to the alignment pulse by introducing a delay in the processing path.

The synchronisation pulse may comprise a pulse of a predetermined width, each alignment pulse generator being configured to sample said pulse and create an alignment pulse within a time interval corresponding to said predetermined width.

The apparatus may further comprise a synchronisation pulse generator for transmitting said synchronisation pulse to each of the processing chains.

Each processing chain may further comprise a first-in-first-out register arrangement (FIFO), the FIFO being configured to receive said sequence of samples and to receive and store said alignment pulses and arrange the sequence of samples into frames in accordance with the alignment pulse in one or more registers, the FIFO registers arrangement being arranged to deliver the samples from the register arrangement to a common processor after a configurable period of time such that corresponding frames from different processing chains are delivered to the common processor synchronously. Frame delineator data may be used to delineate the frames. The frame delineator data may correspond to the alignment pulses. Data is written into a FIFO synchronously to the processing chain clock signal used to process the data in the processing chain but is read from the FIFO synchronously to the clock signal of the digital common processor. To this end, the apparatus may further comprise a reference alignment pulse generator, the reference alignment pulse generator being configured to generate and transmit reference alignment pulses to the FIFOs of said processing chains, each FIFO may be configured to output the sequence of samples in an output stream to the digital processor such that frame delineator data or the alignment pulses in the output stream coincide with the receipt of the reference alignment pulses in the FIFO.

Consequently, the alignment pulse generator and the data selector can be used to arrange the alignment pulses in an appropriate position with respect to the data and the FIFO register can be used to ensure that the pulses, and therefore also the data, are delivered synchronously to the digital processor.

The apparatus may further comprise a plurality of receive antenna feeds for receiving said data streams. Furthermore, the apparatus may further comprise a common digital processor configured to receive data streams from said processing chains.

According to the invention there is also provided a satellite payload comprising the apparatus.

According to the invention, there is also provided a method for facilitating the alignment of non-synchronous input data streams received by an apparatus, the method comprising digitising said data streams into a plurality of sequence of samples; generating alignment pulses for each sequence; arranging each sequence of samples with respect to its corresponding alignment pulses and synchronising the delivery of each sequence of samples to a common digital processor with respect to the alignment pulses for the sequences.

Arranging each sequence of samples with respect to its corresponding alignment pulses may comprise receiving and storing a sequence of samples of the plurality of sequences of samples and the alignment pulses for the sequence and arranging the sequence of samples into frames in accordance with the alignment pulses in one or more registers. Synchronising the delivery of each sequence may comprise extracting the sequence of samples from the one or more registers after a configurable delay such that corresponding data samples of the frames of the plurality of sequences are delivered to the common processor synchronously.

Arranging each sequence of samples may further involve adjusting the position of alignment pulses relative to the samples in the sequence of samples to ensure that corresponding data samples are arranged in corresponding position with respect to respective alignment pulses in the plurality of sequences, wherein each sequence of samples is processed as a number of N sub-streams, N samples being processed at each clock cycle of a clock signal, and wherein adjusting the position of alignment pulses relative to the samples comprises adjusting the timing of an alignment pulse one or more clock cycles to move the alignment pulse N data samples and using a data selector to introduce a delay in the processing of the samples to move the sequence of samples a number of samples between 0 and N−1 samples with respect to the alignment pulses.

BRIEF DESCRIPTION OF THE DRAWINGS

Embodiments of the invention will now be described, by way of example, with reference to the accompanying drawings, in which.

DETAILED DESCRIPTION

Figure 1:
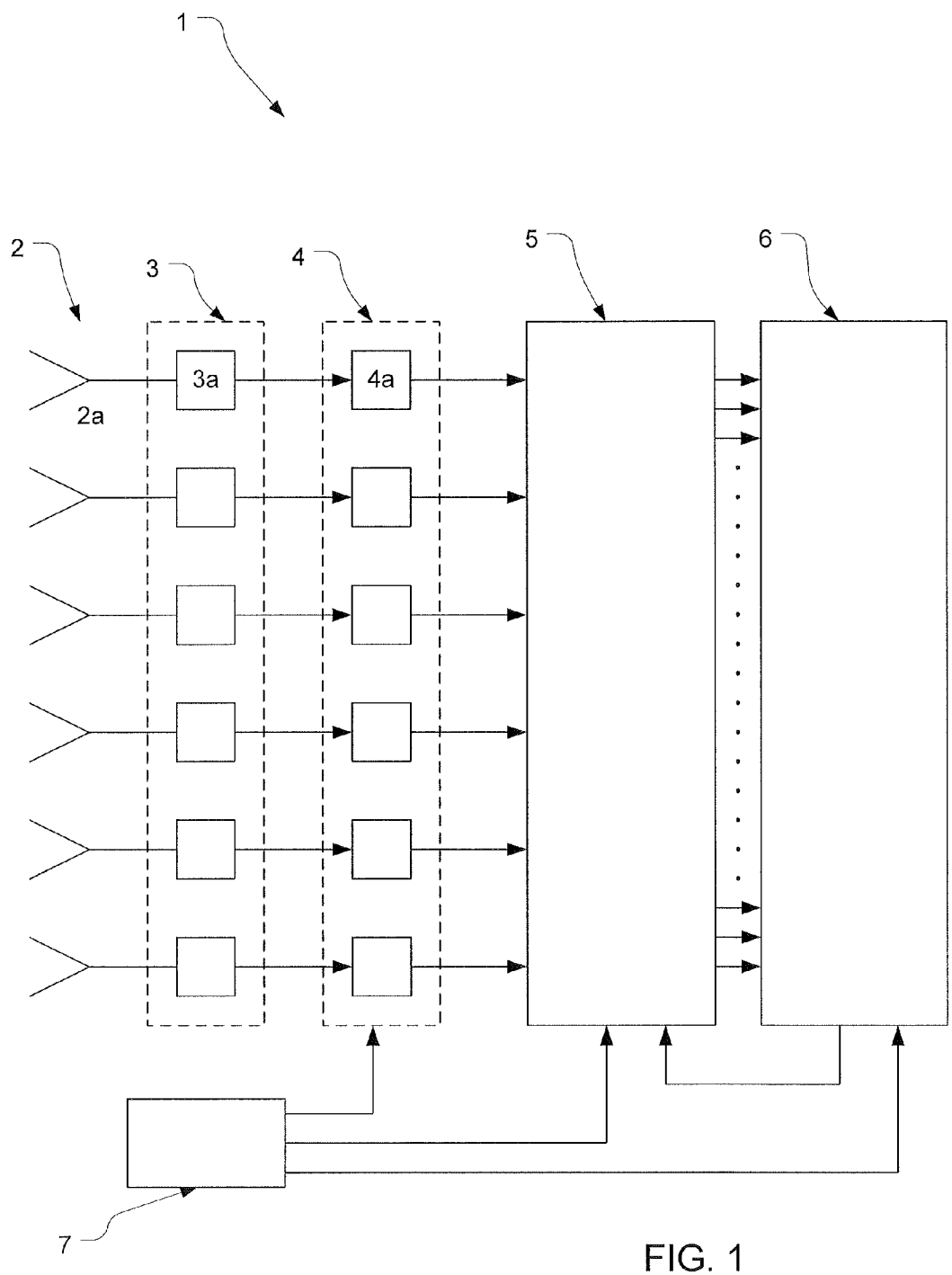
FIG. 1 is a schematic diagram of components of a satellite payload.

With reference to FIG. 1, a satellite payload 1 comprises a plurality of receive antenna feeds 2, receive circuitry 3, an analogue to digital converter (ADC) arrangement 4, a synchronisation processing arrangement 5, a common digital signal processor 6 and a frequency generator unit (FGU) 7. The satellite payload 1 may be located in a communication satellite. The receive circuitry 3 processes the received signals in the analogue domain and may, for example, filter and down-convert the received signals. The ADC arrangement 4 samples the received signals and provides a plurality of streams of digital samples to the synchronisation processing arrangement 5. The synchronisation processing arrangement 5 processes and synchronises the different streams and the common digital processor 6 combines and further processes the received data. The FGU 7 provides a clock signal to the ADC arrangement 4 and the common digital processor 6. It also transmits a synchronisation pulse signal to the synchronisation processing arrangement 5, as will be described in more detail below. It should be understood that the satellite payload may also comprise additional components not shown in FIG. 1.

The payload of FIG. 1 may, for example, provide a phased array antenna arrangement. The digital common processor 6 may, for example, provide a digital beamforming network for the communication satellite to allow the communication satellite to receive a plurality of beams from a plurality of directions. The beams may be generated from the signals received by the antenna feeds of a phased array antenna arrangement. Each data stream may be demultiplexed in the common digital processor 6 into separate frequency channels and one or more beams may be created for each channel by applying complex weights to the signals from different antenna feeds based on the direction of the beams. For successful beamforming to be possible, the data streams received by the different antenna feeds need to be processed coherently.

The receive circuitry 3 and the ADC arrangement 4 comprise separate receive circuitry 3a and a separate ADC 4a respectively for each antenna feed 2a to pre-process and digitise the data stream received by the antenna feed 2a. Additionally, as will be described in more detail below, the synchronisation processing arrangement 5 comprises a separate synchronisation processing chain between each ADC 4a and the common digital processor 6. Consequently, a separate processing chain is provided between each antenna feed 2 and the common digital processor 6 for each data stream received by the antenna feeds 2.

The single FGU 7 is shared between the processing chains and the common digital processor and transmits a clock signal to each of the processing chains and the common digital processor. Each separate processing chain derives its own clock signal from the clock signal received from the FGU 7. The uncertainties between the clock edges of the different clock signals may exceed the clock period, resulting in errors when the different streams are combined in the common digital processor 6.

In more detail, each ADC 4a receives a high rate clock signal $f_s$ from the FGU 7 and samples the data streams based on the received clock signal. The ADC 4a also generates a data clock signal $f_d$ for the processing chain. When the common digital processor 6 requires sufficiently high sampling rates, not all the components of the processing chain can operate at a clock signal having the same high rate as the sampling signal. For example, CMOS technology is often used to implement the digital processor and even if the CMOS logic is sufficiently fast to capture the data at full rate, it is typically not sufficiently fast to carry out any meaningful processing rate at the high rate clock signal. The components downstream from the ADC 4a may therefore operate at a lower rate than the required sampling rates but process the samples as a number of parallel sub-streams. By selecting a suitable number of parallel sub-streams, disparate technologies can be used for conversion and processing. A clock divider is therefore also required in each processing chain to provide a data clock signal at the lower rate. The main sources of uncertainty in the synchronisation between the processing chains are the clock distribution and the clock divider start-up phase ambiguity, both in the ADCs and in the downstream processing chains.

It should be noted that not all synchronisation errors between the data streams arise as a result of the uncertainties between the data clock signals in the different processing chains. Two "corresponding" samples of data captured by two different ADCs may represent data obtained at slightly different instances of the respective continuous analogue signals. For example, the edges of the sampling clock signal $f_s$ from the FGU may arrive at slightly different times in the ADCs, the converters may have different reaction times and the analogue signals may take different times to arrive in the ADC, resulting in some uncertainty between corresponding samples. These uncertainties typically give rise to synchronisation errors which are less than a cycle of the sampling signal, i.e. a fraction of a sample period. The synchronisation processing arrangement corrects for any uncertainties that arise from the different clock signals generated by the ADCs and the clock dividers and used in the processing chains to process the data streams. The "fractional" uncertainty cannot be corrected by the synchronisation processing arrangement 5 but is sufficiently small to be corrected in the digital processor 6.

The fractional uncertainty will hereinafter be described as the "sampling uncertainty".

Figure 2:
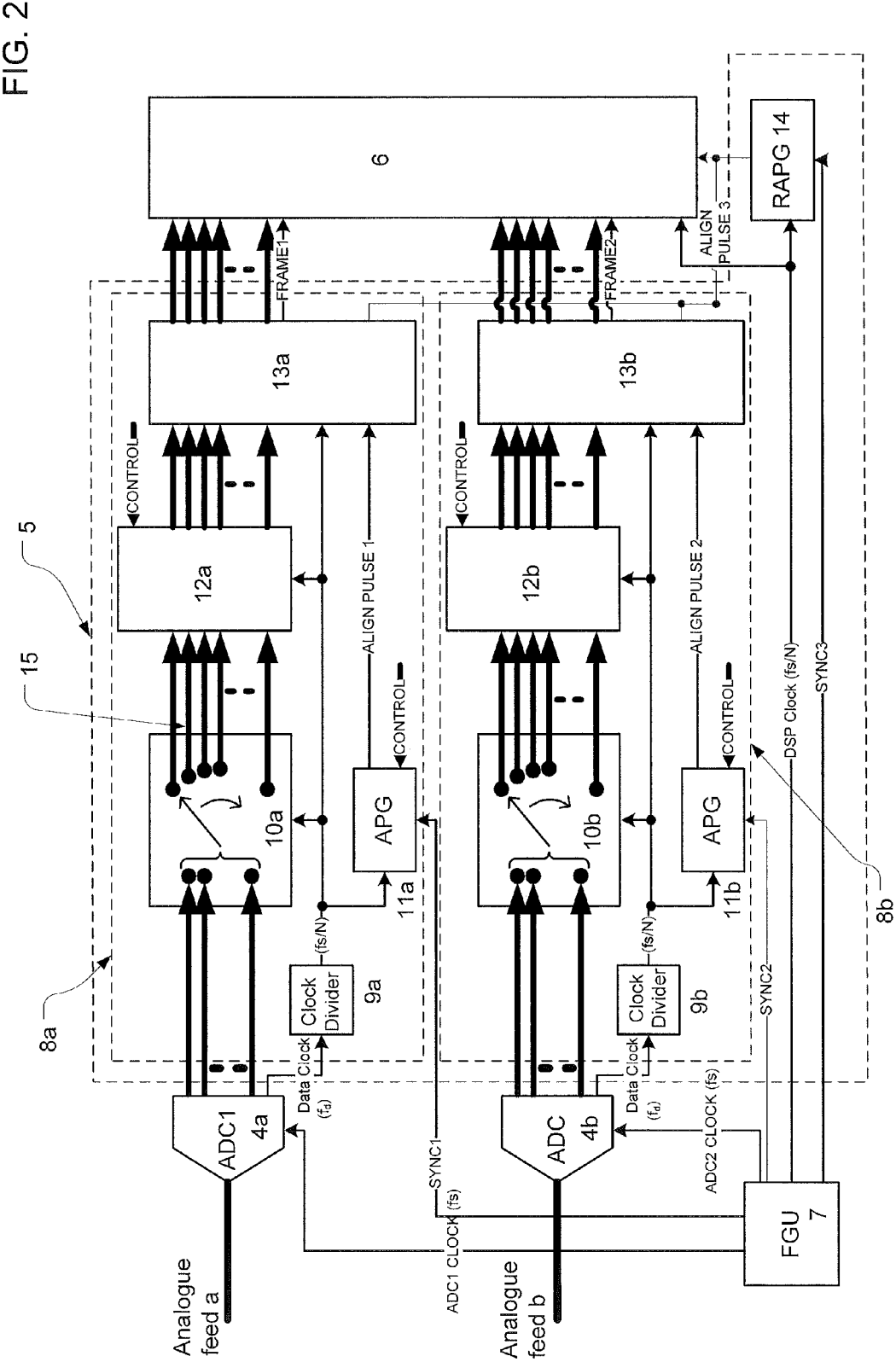
FIG. 2 is a schematic diagram of components of the synchronisation processing arrangement of the satellite payload of FIG. 1.
Figure 3:
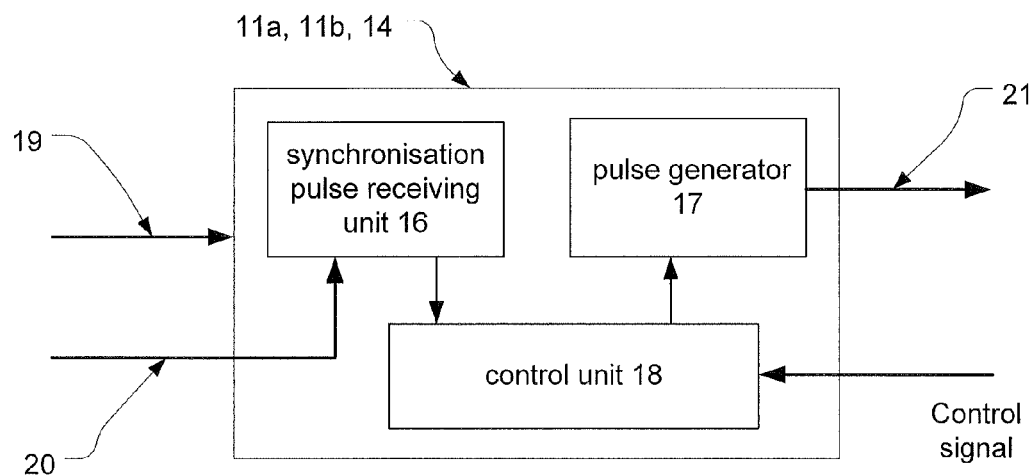
FIG. 3 is a schematic diagram of the components of an alignment pulse generator of the synchronisation processing arrangement shown in FIG. 2.

The synchronisation processing arrangement 5 of the payload 1 is shown in more detail in FIG. 2. The synchronisation processing arrangement 5 comprises one processing chain 8a, 8b for each antenna feed 2a, 2b. FIG. 2 only shows two processing chains 8a, 8b but the synchronisation unit can be scaled to have any number of processing chains to synchronise the data streams from any number of feeds. Each processing chain 8a comprises a clock divider 9a, a commutator 10a, an alignment pulse generator (APG) 11a, a data selector 12a and a first-in-first-out register arrangement (FIFO) 13a. Each alignment pulse generator generates alignment pulses for its respective processing chain. The synchronisation processing arrangement 5 also comprises an additional alignment pulse generator 14 common to the processing chains 8a, 8b. The additional alignment pulse generator 14 provides reference alignment pulses for synchronising the different processing chains and the additional alignment pulse generator 14 will hereinafter be referred to as a reference alignment pulse generator (RAPG). The FGU 7 may provide a synchronisation pulse generator that generates synchronisation pulses and transmits the synchronisation pulses to each of the alignment pulse generators 11a, 11b, 14.

The FGU 7, the ADC arrangement 4 and the components of the synchronisation processing arrangement 5 will now be described in more detail with respect to a specific processing chain 8a. However, it should be realised that the plurality of processing chains may be identical and the description of one processing chain applies to any processing chain. The FGU 7 generates a clock signal $f_s$ and distributes it via buffers to each ADC 4a and the common digital processor 6. The ADCs 4a sample the received data at sampling frequency $f_s$ and each ADC transmits the samples M-ways to its respective processing chain 8a of the synchronisation processing arrangement 5. It should be realised that the value of M depends on the implementation of the ADC and in some embodiment, for relatively slow ADCs, M can be equal to 1. Each ADC 4a also produces its own data clock signal, $f_d$, based on the clock signal received from the FGU 7. In one embodiment, the rate of the clock signals $f_d$ and $f_s$ may be 100 MHz. However it should be realised that any suitable sampling clock frequency and data clock frequency can be used. The rate of the data clock signal $f_d$ may be a fraction of $f_s$.

Each ADC 4a transmits the data clock signal $f_d$ it has generated to the clock divider 9a of the respective processing chains 8a. Each clock divider 9a receives the data clock signal $f_d$ from its ADC 4a and divides the clock signal into a new data clock signal $f_s/N$, where N is equal to the number of parallel sub-streams 15. As mentioned above, N is selected such that the new data clock signal provides a clock rate $f_s/N$ at which all the components of the processing chain 8a can operate. A commutator 10a is provided to divide the data received from the ADC 4a into the N sub-streams. In other words, the commutator is an M-to-N way commutator. The commutator 10a is slaved to the clock signal $f_s/N$. As an example, a typical value of M is 2 and a typical value of N is 4. Consequently, in the example where the sampling rate is 100 MHz, the components of the synchronisation processing chains 8a would process the digitised data in 4 sub-streams at a rate of 25 MHz. However, it should be realised that M and N can be any suitable values. The clock signals of all the processing chains have the same clock rate $f_s/N$. However, the clock edges may not coincide due to the uncertainties between the clock distribution and start-up phase ambiguity of the clock dividers 9a, 9b.

The samples are delivered from the commutator 10a to the common digital processor 6 via a data selector 12a and a FIFO 13a. If the data streams are not synchronised, the data streams may be a number of samples out of synchronisation when they are delivered to the common digital processor 6. The synchronisation arrangement is provided to ensure that corresponding data samples in the data streams are provided to the common digital processor 6 in synchronisation. To this end, the alignment pulse generator 11a in each processing chain provides alignment pulses to the FIFO 13a of that processing chain that is used to delineate frames in the sequence of samples of the processing chain based on the time of arrival of the samples to the FIFO and the time of arrival of the pulses to the FIFO. In one embodiment, the arrival of an alignment pulse determines the beginning of a new frame. The reference alignment pulse generator 14 also provides reference alignment pulses, common to all processing chains, to the FIFOs. The reference alignment pulses may also be transmitted to the common digital processor 6. In some embodiments, the data is output from the FIFO of each processing chain to the common digital processor 6 such that the alignment pulses of the processing chains coincide with the reference alignment pulses of the reference alignment pulse generator 14.

Moreover, in addition to providing the alignment pulses, each processing chain also rearranges the data to make sure that the data in one frame corresponds to the data in a corresponding frame in another processing chain. The rearrangement of data is achieved by adjusting the timing of the alignment pulse, as will be described in more detail below. The rearrangement of data is also achieved by introducing delay in the sequence of samples in the data selector 12a with respect to the timing of the alignment pulses, as will also be described in more detail below. By adjusting the timing of the alignment pulses of each processing chain 8a, 8b and the timing of the data to determine suitable positions of the alignment pulses in the data sequence in one chain with regards to the positions of the alignment pulses in the data sequences of the other chains and then synchronising the output of the alignment pulses from the processing chains, the data can be provided to the common digital processor 6 coherently. According to some embodiments of the invention, the alignment pulse generator 11a and the data selector 12a can adjust their operation based on control signals from the common digital processor 6 to ensure that the data streams are synchronised.

The generation of the alignment pulses will now be described with respect to FIGS. 3, 4, 5a, 5b and 5c. With respect to FIG. 3, an alignment pulse generator 11a, 11b and 14 comprises a synchronisation pulse receiving unit 16, a pulse generator unit 17 and a control unit 18. With respect to FIGS. 3 and 4, the alignment pulse generator 11a, 11b, 14 receives a clock signal 19 and distributes the clock signal to all the elements where it is required. In the alignment pulse generators 11a, 11b provided in the processing chains, the data clock signal is received from the clock dividers 9a, 9b and is the same data clock signal, with a rate of $f_s/N$, to which the commutators 10a, 10b are slaved. In the reference alignment pulse generator 14, the clock signal is based on the clock signal provided from the FGU 7 to the common digital processor 6. The digital processor may operate using a clock signal $f_s/N$ and the clock signal provided to the reference alignment pulse generator 14 may also have a rate of $f_s/N$. A divider (not shown) may be provided in the FGU 7, the digital processor 6, and/or between the FGU and the digital processor to divide the original clock signal $f_s$ generated by the FGU 7. In some embodiments, the reference alignment pulse generator receives its clock signal directly from the FGU 7. In other embodiments, the reference alignment pulse generator 14 receives its clock signal from the common digital processor 6. Moreover, in some embodiments, a clock divider for dividing the original clock signal $f_s$ is located partly in the FGU 7 and partly in the digital processor 6. It should be realised that although "$f_s/N$" is used hereinafter to denote the clock rate of the clock signal in the common digital processor and the clock rates of the clock signals of the processing chains, the clock signals in the common digital processor and each of the processing chains are different clock signals.

The synchronisation pulse receiving unit 16 receives the synchronisation pulses 20 transmitted from the FGU 7. The FGU 7 generates a synchronisation pulse signal and distributes the synchronisation pulse signal via buffers to each of the alignment pulse generators. The synchronisation pulse receiving unit 16 detects the synchronisation pulses 20 of the synchronisation signal from the FGU 7 at a time determined by the clock edges of the received clock signal 19, as will be described in more detail with respect to FIG. 4. The pulse generator 17 is configured to generate the alignment pulses 21 at regular intervals based on the timing of the synchronisation pulses 20 and the clock signal 19, under control of the control unit 18.

Figure 4:
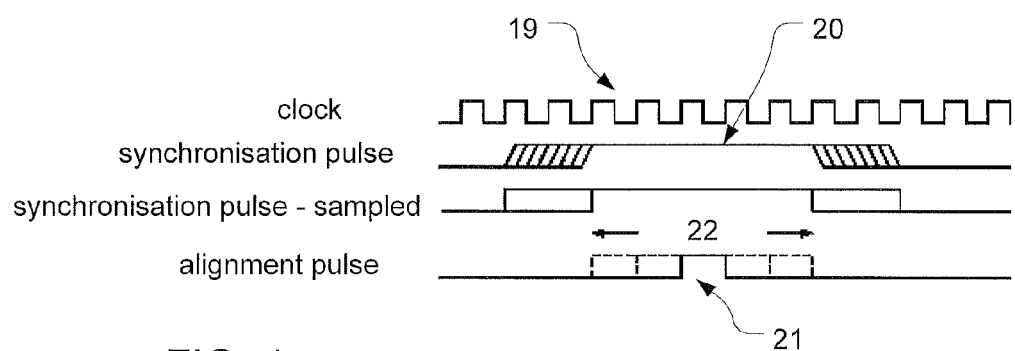
FIGS. 4, 5a, 5b and 5c illustrate the operation of the alignment pulse generator.

The relationship between the clock signal 19, the synchronisation pulses, the synchronisation pulses as sampled by the synchronisation pulse receiving unit 16 and the alignment pulses is shown in FIG. 4. The clock signal 19 has a rate of $f_s/N$ and may be a clock signal of one of the processing chains or the clock signal of the common processor 6. All the clock signals have a rate $f_s/N$ but the edges may not coincide. The repetition rate of the clock signal 19 is a multiple of the synchronisation pulse rate and the alignment pulse rate. As shown in FIG. 4, there is uncertainty as to exactly when the edges of the synchronisation pulse might occur with respect to the clock signal $f_s/N$ 19. FIG. 4 shows the uncertainty to extend over two clock periods but the uncertainty could be larger or smaller. The sampled synchronisation pulse shows the possible edges of the sampled signals generated in the synchronisation pulse receiving unit 16 of the alignment pulse generator 11a, 11b, 14. Depending on the timing of the clock signal received and the edges of the synchronisation pulse, the edges of the sampled synchronisation pulse may occur anywhere in small intervals following the edges of the received synchronisation pulse. The synchronisation pulse, according to some embodiments of the invention, is wide enough such that after allowing for the difference between the timing of the edges of the clock signal and the timing of the edges of the synchronisation pulses, it provides a window 22 within which an alignment pulse may be safely placed to allow a sequence of alignment pulses spaced at regular intervals. This window 22 will hereinafter be referred to as the "safe alignment pulse window". After an initial adjustment period, the alignment pulse generator 11a, 11b, 14 finds the safe alignment pulse window and provides the alignment pulse at the same time with respect to the safe alignment pulse window in each safe alignment pulse window 22. The alignment pulse 21 may have the width of a single cycle of the clock signal 19. However, a different width is also contemplated. Each alignment pulse generator may generate its own safe alignment pulse window and place its alignment pulses within it. The safe alignment pulse windows of the different alignment pulse generators overlap in most cases but their extremes will not necessarily coincide.

It should be noted that, in some embodiments, the alignment pulse rate may be a multiple of the synchronisation pulse rate. For example, the pulse generator 17 may generate alignment pulses 21 such that every other or every third alignment pulse is placed in a safe alignment pulse window of the synchronisation pulse 20.

In order to ensure that the data of a frame in one processing chain corresponds to the data of the corresponding frame in another processing chain, the common digital processor 6 may instruct the control unit 18 of the alignment pulse generators 11a, 11b in the processing chains to advance or retard the position of the alignment pulse 21 by one or more cycles of the clock signal 19. The safe alignment pulse window is designed to be wide enough to allow the control unit 18 to advance or retard the alignment pulse by a small number of cycles and still ensure that the alignment pulse is placed within the safe alignment pulse window 22. In some embodiments, if the instructions from the common digital processor 6 result in the alignment pulse being placed outside the safe alignment pulse window 22, the alignment pulse generator will automatically bring the alignment pulse 21 back within the safe alignment pulse window. By controlling where multiple alignment pulse generators 11a, 11b belonging to the different processing chains 8a, 8b generate their alignment pulses with respect to each other, the data streams of multiple feeds may be aligned in steps of N samples, i.e. the number of samples processed in each cycle of the clock signal $f_s/N$. This is further illustrated in FIGS. 5a, 5b and 5c, as will be explained below.

Figure 5:
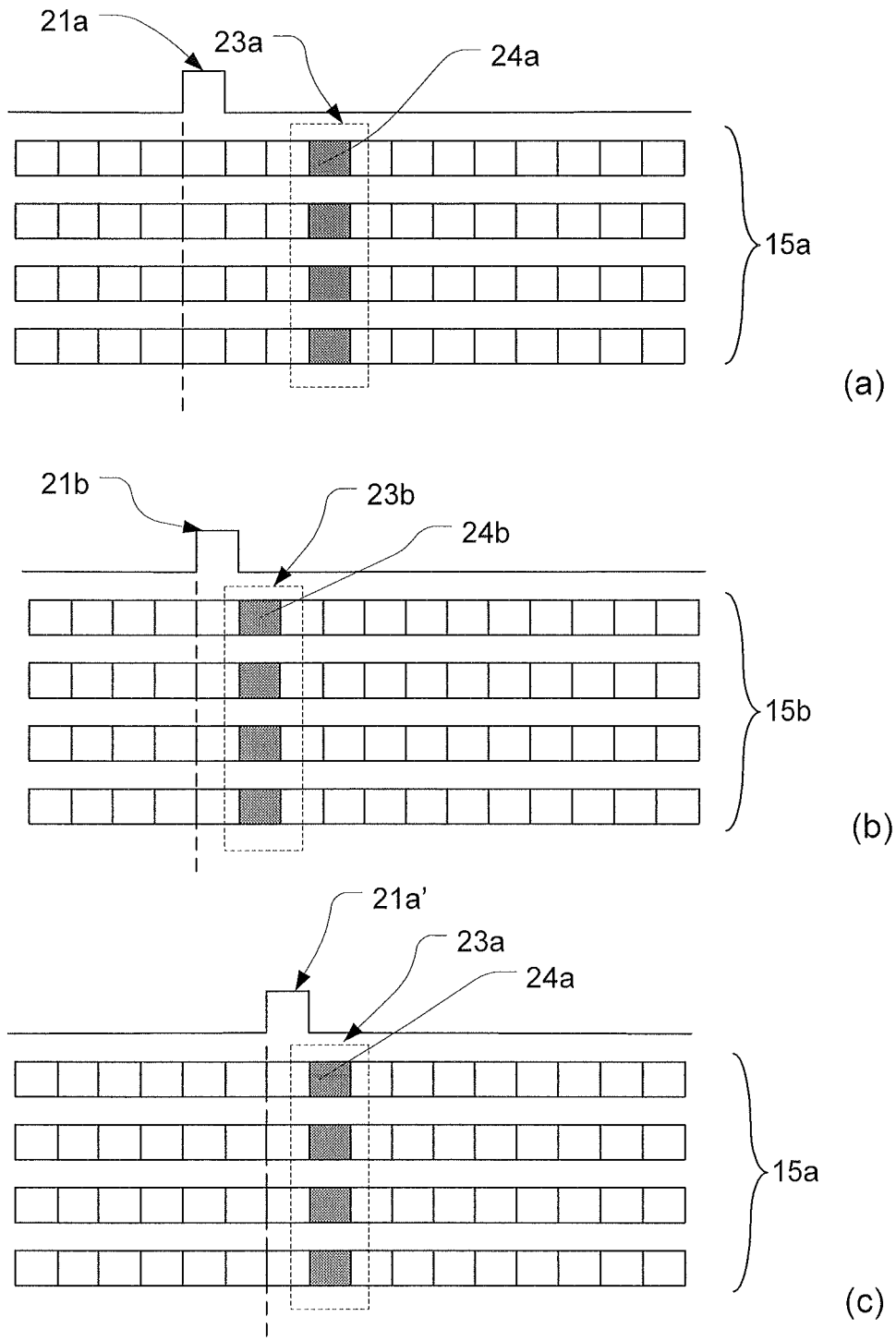

With reference to FIGS. 5a, 5b and 5c, the data in each processing chain 8a, 8b is processed in N sub-streams 15a, 15b. Consequently, in every cycle of the data clock signal $f_s/N$ 19, a set 23a, 23b of N data samples 24a, 24b are output by the respective commutator 10a, 10b. In FIGS. 5a, 5b and 5c, N is 4 and each set comprises 4 data samples 24a, 24b. FIGS. 5a and 5b and 5c also show the alignment pulses 21a, 21b of the respective processing chains. The alignment pulses indicate the beginning of frames of the sequence of data samples. Time is indicated horizontally from the left to the right in FIGS. 5a, 5b and 5c. FIG. 5a shows the data stream in a first processing chain 8a with a first number of sets 23a of data samples 24a. FIG. 5b shows the data streams in a second processing chain 8b with corresponding sets 23b of data samples 24b. As mentioned above, it should be noted that two corresponding data samples 23a, 23b may not represent samples generated at exactly the same time or exactly corresponding instances of the analogue signals. However, this sampling uncertainty can be corrected in the common digital processor 6. Hereinafter, "corresponding data sample", "corresponding sets of samples" and "corresponding data frames" mean data samples, sets and frames that are only out of synchronisation by a fraction of a sampling period as a result of the sampling uncertainty.

As is indicated schematically in FIGS. 5a and 5b, the edges of the clock signals in the different processing chains may not coincide. Moreover, the alignment pulses of the different processing chains may not coincide either. Furthermore, the alignment pulse 21a of one processing chain is positioned in a different place with respect to the marked set of samples 23a compared to the position of the alignment pulse 21b of the other processing chain with respect to the corresponding marked set of samples 23b. The marked set of samples 23a of the first processing chain 8a would arrive at the FIFO 13a of the first processing chain three cycles after the alignment pulse 21a in the first processing chain 7a but the corresponding marked set of samples 23b of the second processing chain 8b would arrive in the FIFO 13b of the second processing chain 8b one cycle after the alignment pulse 21b in the second processing chain 8b. Consequently, if the common data streams would be delivered to the common digital processor 6 without adjustment, the data would be approximately eight samples, equal to 2 cycles of 4 samples, out of synchronisation plus a fraction of a sample corresponding to the sampling uncertainty.

FIG. 5c shows an adjusted alignment pulse 21a' for the first processing chain 8a. Based on instructions from the common digital processor 6 via the control unit 18, the pulse generator unit 17 of the alignment pulse generator 11a of the first processing chain 8a has delayed the generation of the alignment pulse 21a' two cycles. Consequently, the marked set of samples 23a in FIG. 5c would now arrive at the FIFO 13a one cycle after the alignment pulse 21a' of the first processing chain 8a. Accordingly, corresponding samples in the two chains 8a, 8b would arrive in their respective FIFOs 13a, 13b at the same time with respect to the alignment pulses in the two processing chains and the data in the frame beginning with the alignment pulse 21a' in the first processing chain corresponds to the data in the frame beginning with the alignment pulse 21b of the second processing chain. However, it should be noted that, as shown in FIGS. 5b and 5c, without adjustments downstream in the processing chains the corresponding sets of data would still arrive at different absolute times at the common digital processor 6.

The samples and the alignment pulses are written into the FIFO 13a, 13b when they arrive at the FIFO 13a, 13b. If the alignment pulses 21a, 21b of the data streams shown in FIGS. 5a and 5c are delivered to the common digital processor 6 at the same time, the two marked sets of samples will arrive at the common digital processor 6 simultaneously. The common digital processor 6 then only has to adjust for the remaining sampling uncertainty between the data. In some embodiments, the alignment pulses 21a, 21b are output from the FIFO synchronously with the reception in the FIFO of alignment pulses of the reference alignment pulse generator 14 associated with the common digital processor, as will be described in more detail below with respect to FIGS. 8 and 9.

The reference alignment pulse generator 14, associated with the digital common processor 6, may have the same structure as the alignment pulse generators 11a, 11b belonging to the respective processing chains. However, in some embodiments, the reference alignment pulse generator 14 may not receive a control signal and the reference alignment pulse generator may not be configured to advance or retard the alignment pulses since the reference alignment pulse generator 14 provides reference alignment pulses, to which the other alignment pulses are aligned, and the timing of the reference alignment pulses may not require adjustment.

The operation of the data selector 12a, 12b will now be described with respect to FIGS. 6, 7a, 7b, 7c and 7d. FIGS. 7a, 7b, 7c and 7d also illustrate the combined synchronisation effect of the adjustments provided by the alignment pulse generators 11a, 11b and 14 and the data selectors 12a, 12b.

Figure 6:
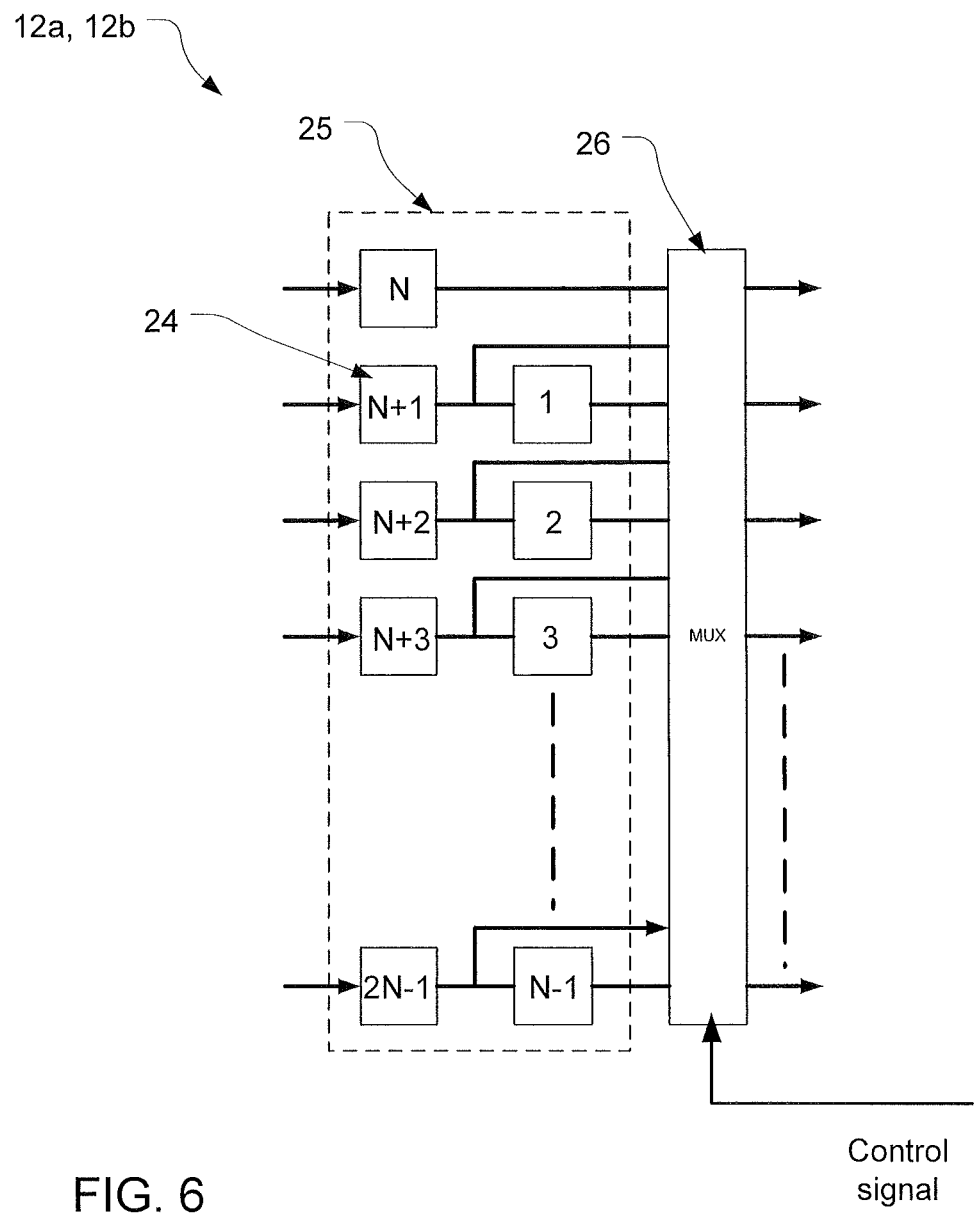
FIG. 6 is a schematic diagram of a data selector of the synchronisation processing arrangement shown in FIG. 2.

With respect to FIG. 6, a data selector 12a, 12b comprises a data register 25 and a multiplexer 26. A clock signal $f_s/N$ (not shown in FIG. 6) is received from the clock divider 9a, 9b of the processing chain in which the data selector is located and used where required. The sequence of samples 24 are received from the relevant commutator 10a, 10b and are written into the data register 25 for storing. As shown in FIG. 6, the samples representing the latest N−1 samples are pipelined. The multiplexer is then set via a command from the digital processor 6 to select the samples that are to form its output set. The data selector 12a, 12b can be considered to provide a rotating operation on the data and will be described hereinafter as a rotator. The rotation is equivalent to a delay and has a resolution of 1 sample and a range of 0 to N−1 samples. In FIG. 6, sample 1 is the oldest sample and sample 2N−1 is the newest sample.

Figure 7:
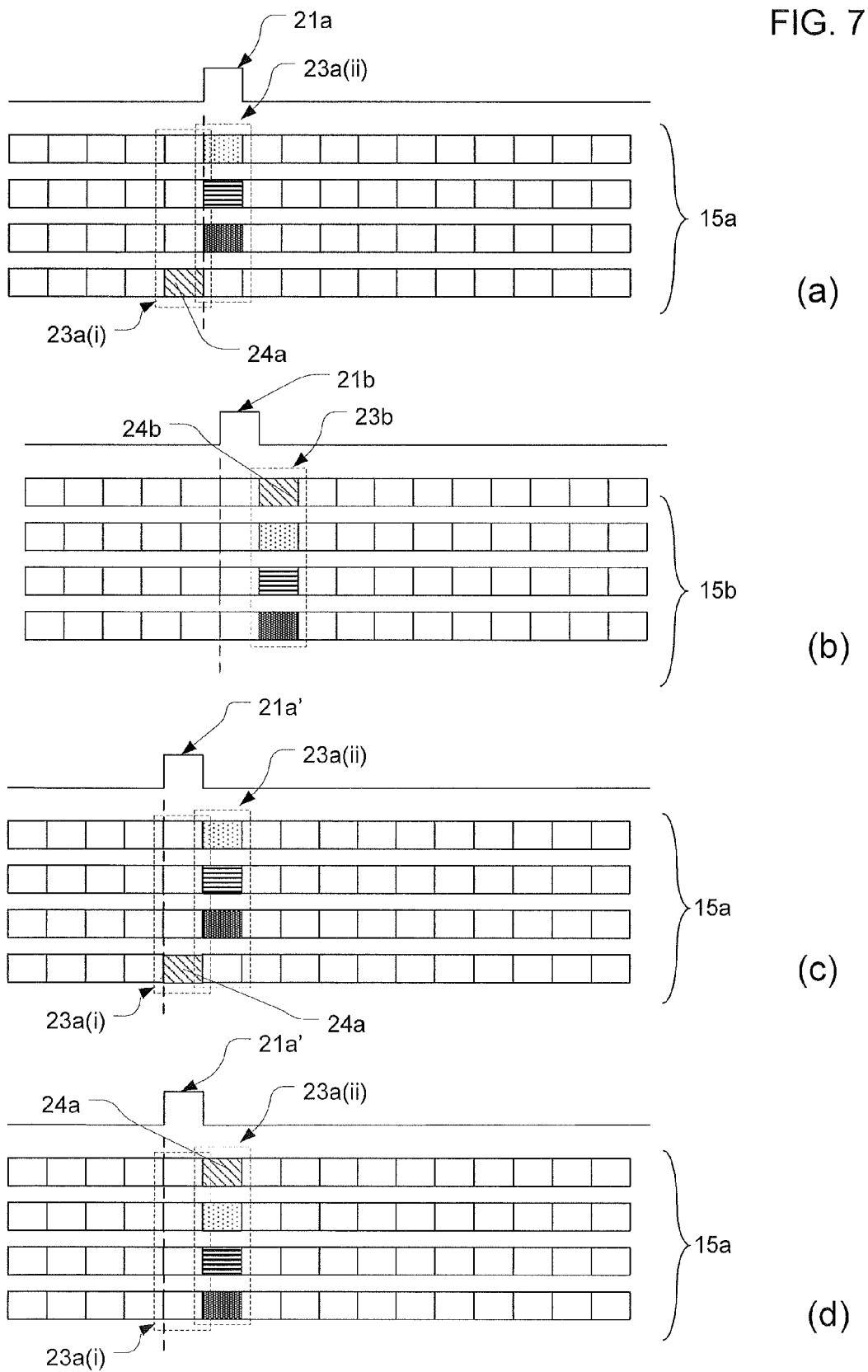
FIGS. 7a, 7b, 7c and 7d illustrate the operation of the data selector.

How the data can be aligned in steps of 1 sample will now be described with respect to FIGS. 7a, 7b, 7c and 7d. FIG. 7a shows the data stream in a first processing chain 8a. The data stream comprises a plurality of sets 23a(i), 23(ii) of data samples 24a, each associated with a cycle of the clock signal $f_s/N$ of the first processing chain. FIG. 7b shows the data stream in a second processing chain 8b. The data stream of the second processing chain 8b also comprises a plurality of sets 23b of data samples 24b, each being associated with a cycle of the clock signal $f_s/N$ of the second processing chain. Time is indicated horizontally from left to right. As is indicated schematically in FIGS. 7a and 7b, the edges of the clock signals in the different processing chains may not coincide. FIGS. 7a, 7b, 7c and 7d also show the timing of the alignment pulses of the processing chains with respect to the data. The alignment pulses delineate the data into frames.

Because of the timing uncertainty between the processing chains, the samples associated with one clock cycle in one chain may not correspond to the samples associated with a corresponding clock cycle in the other processing chain. Instead, as indicated with respect to FIGS. 7a and 7b, the marked data samples of the first processing chain 8a correspond to the marked data samples in the second processing chain 8b. In the first processing chain 8a, the marked samples are split over two sets 23a(i) and 23a(ii), corresponding to two cycles of the clock signal. The first marked sample 24a is included in a first set 23a(i) and the last three samples are included in a second set 23a(ii). In the second processing chain, the marked samples are in a single set corresponding to a single cycle of the clock signal. The set of samples 23b comprising all the marked samples of the second processing chain 8b arrives in the FIFO 13a one cycle after the alignment pulse 21b of the second processing chain. The first and the second sets 23a(i), 23a(ii) comprising the marked samples of the first processing chain arrive in the FIFO of the first processing chain one cycle before and at the same time respectively as the alignment pulse 21a of the first processing chain 8a. If the data streams were not adjusted, the first sample 24a of the marked samples in the first processing chain 8a would arrive 5 samples earlier than the corresponding sample 24b in the second processing chain 8b. Consequently, the data from the two processing chains would be 5 samples out of synchronisation when it arrives in the digital processor 6 plus possibly a fraction of a sample as a result of any sampling uncertainty.

As shown with respect to FIG. 7c, to ensure that the data streams are processed coherently, the alignment pulse generator 11a may first adjust the timing of the alignment pulse 21a of the first processing chain 8a to advance it by one cycle based on instructions received from the common digital processor 6. The set of samples 23a(i) that includes the first marked sample 24a would then arrive in the same cycle as the alignment pulse and the set of samples 23a(ii) that includes the last three marked samples would arrive one cycle after the adjusted alignment pulse 21a'. Accordingly, the set of samples 23a(ii) that includes the last three marked samples is now arranged in the same position with respect to the alignment pulse in the first processing 8a as the set of marked samples 23b of the second processing chain is arranged with respect to the alignment pulse in the second processing chain 8b. With respect to FIG. 7d, the rotator 12a then ensures that all the marked samples of the first processing chain are moved into the same cycle by introducing a delay. When the first set 23a(i) arrives at the rotator 12a, it pipelines the latest N−1 samples, which in this case corresponds to the three latest samples. When the next set, corresponding to the second set of samples 23a(ii), arrives in the next cycle, it sends the first marked sample, which was one of the pipelined three samples, to the multiplexer 26 together with the first three samples of the second set 23a(ii). The rotator 12a then empties the data register 25 and stores the last N−1 samples of the second set 23a(ii). Consequently, after the rotation, the four marked samples in the first processing chain 8a are all included in a single cycle that arrives in the FIFO 13a one cycle after the alignment pulse 21a' of the first processing chain.

The FIFOs 13a, 13b store the alignment pulses 21a', 21b and the data in both data streams and outputs the alignment pulse such that they are aligned with a reference alignment pulse generated by the reference alignment pulse generator 14. Since the sets of data are output with respect to the common digital processor at times corresponding to the times they arrived in the FIFO with respect to the alignment pulse, the data of corresponding frames in the two processing chains 8a, 8b are output to the common digital processor 6 at the same time.

Figure 8:
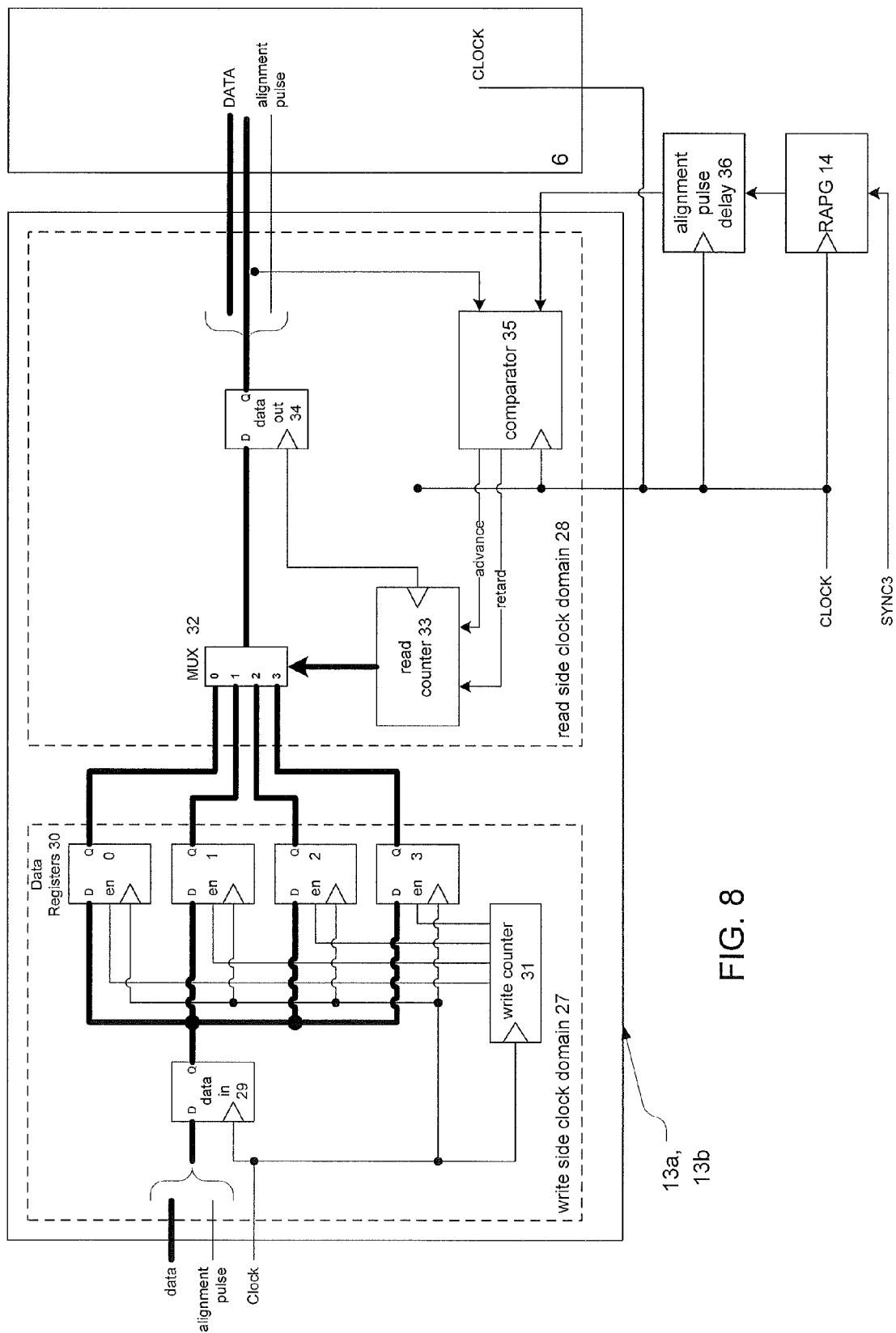
FIG. 8 is a schematic diagram showing the components of a register arrangement of the synchronisation processing arrangement of FIG. 2.
Figure 9:
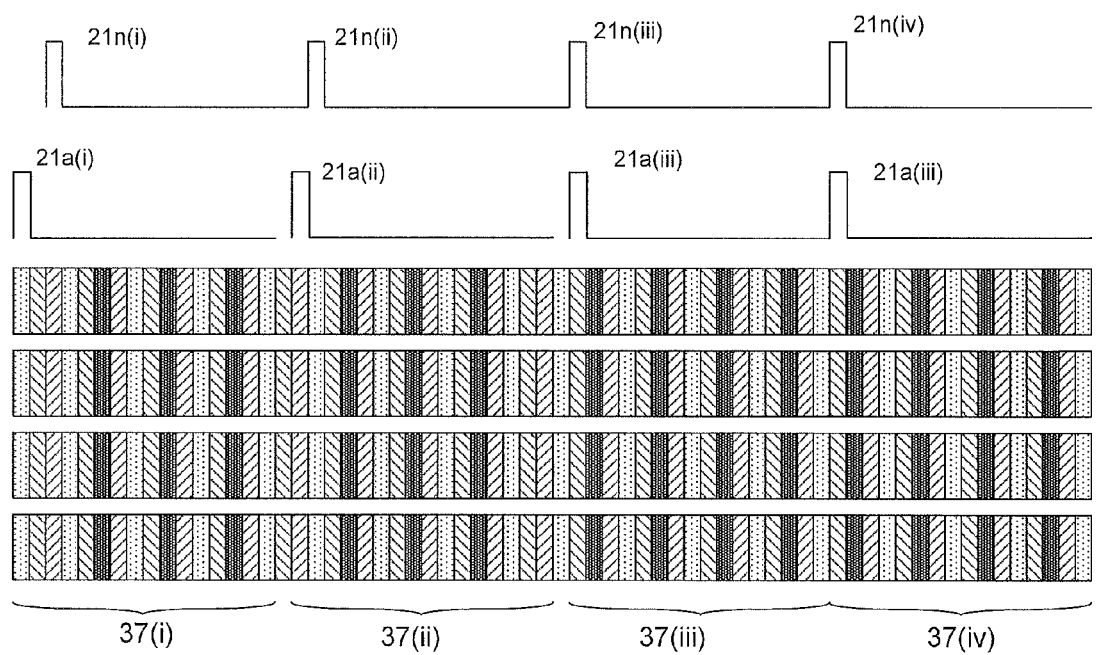
FIG. 9 illustrates how data samples processed in the synchronisation processing arrangement of FIG. 2 are divided into frames and how the timing of the frames in different processing chains of the satellite payload are synchronised.

The FIFO 13a, 13b and the extraction of the data samples will now be described in more detail with respect to FIGS. 8 and 9. The FIFO comprises a write side clock domain 27 and a read side clock domain 28. The clock of the write side clock domain 27 is sourced via the ADC 4a, 4b and the clock divider 9a, 9b of the same chain but the clock of the read side clock domain 28 is not. The clock on the read side clock domain originates from the FGU 7 and is the same clock signal that is used by the digital processor 6. The clock signal in the read side clock domain may arrive in the FIFOs via the digital processor. The clock signal in the write side clock domain and the write side clock domain have the same rate $f_s/N$ but the clock edges may not coincide. There is therefore a relative timing uncertainty that exists between them. A clock signal is provided to all the components of the FIFOs 13a, 13b that require the use of a clock signal. The clock signal is either the write side clock signal or the read side clock signal, depending on the location of the component.

The write side clock domain 27 comprises a data-in register 29, a set of data storage registers 30 and a write counter 31. The read side clock domain 28 comprises a multiplexer 32, a read counter 33, a data-out register 34 and a comparator 35.

The data-in register 29 receives and captures the sequence of samples in the N sub-streams from the relevant rotator 12a, 12b and writes the samples of data into the data storage registers 30. It also receives and captures the alignment pulses from the alignment pulse generator 11a, 11b in the same processing chain. The alignment pulses may be stored alongside the data samples. A pulse may be stored as a single bit. For example, an alignment pulse may be represented as a 1 followed by a number of zeros. Based on the timing of the alignment pulses and the timing of the data samples in the sequence of data samples, the alignment pulses provide frame delineator data that divide the data samples into frames, as will further be described with respect to FIG. 9.

The set of data storage registers 30 forms the main storage area of the FIFO 13a. In FIG. 8, the set of data storage registers comprises four registers, labelled 0 to 3. Data will be written into the FIFO N samples at a time and each register would need to have a width of N samples plus the volume required to represent the alignment pulse. In some embodiments, the volume required to represent the alignment pulse may be a single bit. By having a depth of 4, as shown in FIG. 8, the FIFO 13a is capable of introducing a delay of 4 clock periods. It should be realised that the depth is arbitrary and would be selected depending on the uncertainty expected in the system.

The write counter 31 is a free running counter. It increments once each clock cycle of the write side clock signal received from the clock divider 9a, 9b and, in an embodiment with 4 data storage registers, will count in the sequence 0, 1, 2, 3, 0, etc. Each clock cycle, one of the data storage registers 30 will be enabled, the chosen register being reflected by the write counter value, and will capture the data from the data-in register 29.

The read counter 33 also provides a free running counter. It also increments once each clock cycle of the read side clock signal and, in the embodiment including 4 data storage registers, will count in the sequence 0, 1, 2, 3, 0, etc. The value of the read counter determines which data storage register 30 is read and delivered to the digital processor 6.

The contents of the data storage register 30 are passed to the read side clock domain 28 and presented to a multiplexer 32. The multiplexer receives all sets of N samples and the alignment pulse bits from the register, multiplexes the received data as indicated by the read counter 33 and passes it to the data out register 34, which in turn delivers the data to the common digital processor 6. It should be noted that the data is delivered to the digital common processor in synchronisation with the clock signal in the read side clock domain 28 and not with the clock signal of the write side clock domain 27. Moreover, since the read side clock domains 28 of all the FIFOs 13a, 13b use the same clock signal, which is also the clock signals used by the common digital processor 6, cycles of data are provided synchronously to the common digital processor 6.

The comparator 35 receives the alignment pulses generated by the reference alignment pulse generator 14. The alignment pulse may be delayed by a number of clock cycles as will be described in more detail below. The comparator 35 also receives the alignment pulses from the data out register 34 and generates advance or retard signals to the read counter 33 depending on the relative positions of the pulses in time.

If the alignment pulse from data our register 34 arrives in the comparator before that from the reference alignment pulse generator 14, then the retard signal is asserted for a single clock cycle. If the alignment pulse from the data out register occurs after that from the reference alignment pulse generator 14, then the advance signal is asserted for a single clock cycle. If the alignment pulses from data out register 34 and those from the reference alignment pulse generator 14 coincide, then the advance and retard signals remain deasserted.

The comparisons will continue every time an alignment pulse is received and the effect upon the state of the read counter 33 of the advance and retard signal assertions is to alter the counting such that the alignment pulses from data out register move towards coincidence with the reference alignment pulse from the reference alignment pulse generator 14.

Data corruption can occur when a register within the set of data storage registers 30 is being read from at a time close to when it is being updated. To avoid this situation, the reference alignment pulses from the reference alignment pulse generator 14 is delayed by a number of clock cycles, of the clock signal with a rate of $f_s/N$, in an alignment pulse delay unit 36. The alignment pulse delay unit 36 may be provided as part of the RAPG 14, as part of the digital processor or as a separate unit. The number of clock cycles by which it is delayed is set to a value that ensures that the above described situation can never occur. It has been found that for maximum robustness to timing uncertainties, the delay would be such that the read and write counter values are separated by the half the FIFO depth expressed in clock cycles when the alignment pulses from data storage registers and the alignment pulse delay unit are coincident.

It should be realised that the depth of the FIFO need only be sufficient to allow compensation for the timing uncertainties. Typically, the depth of the FIFO is much less than that required to store an entire frame. For example, in one typical embodiment, a frame would comprise 1920 samples but the FIFO would only have a depth of 16, where the depth is the number of clock cycles the FIFO can store. The total adjustment range can be set at design time via the depth of the FIFOs. With a typical N equal of 4, a frame would comprise 480 cycles of data.

By synchronising with the reference alignment pulses from the reference alignment pulse generator 14, the FIFOs effectively introduce a delay in the processing of the data streams. Since the alignment pulses of the different processing chains occur at different times, different delays will be introduced by different FIFOs to synchronise the data streams With reference to FIG. 9, the alignment pulses 21a(i)-21a(iv) of a first processing chain, output at the data out register 34, and the reference alignment pulses 21n(i)-21n(iv) of the reference alignment pulse generator 14 are shown. FIG. 9 also shows the data stream of the first processing chain, also output at the data out register 34, being divided into frames 37(i), 37(ii), 37(iii), 37(iv). The alignment pulse generator may be configured to generate, for example, frames of 16 cycles of data, as indicated in FIG. 9. When N is equal to 4, each frame would then contain 64 samples. Consequently, alongside the data, the registers 30 would store a 1 followed by 15 zeros. As shown in FIG. 9, the alignment pulses in the first processing chain, output from data out register 34, are advanced with respect to the reference alignment pulses. This fact is recognised by the comparator 35 which sends a retard signal to the read counter thereby causing the advancement to be reduced by one cycle which is equivalent to N samples. The process of retarding the read counter is repeated until the advancement is eliminated. In FIG. 9, the alignment pulses coincide after two frames as shown by the timing of the third alignment pulses 21a(iii), 21n(iii). Retarding the read counter means that the same N data samples are read twice from the data register 30 and then output by the data-out register 34.

In a situation where the alignment pulses in the first processing chain output from data out register 34 are retarded with respect to the reference alignment pulses, the comparator issues advance signals to the read counter thereby advancing the alignment pulses output from data out register 34 by 1 cycle (or N samples) closer to the reference alignment pulses. The process of advancing the read counter is repeated until the pulses are coincident. Advancing the read counter causes a set of N samples never to be read.

If the alignment pulse generator 11a of the first processing chain 8a was instructed by the common digital processor 6 to advance the alignment pulse by a cycle of the $f_s/N$ clock signal, as described with respect to FIGS. 7a to 7c, the arrival of the alignment pulses 21a in the FIFO would be advanced by a cycle. The comparator would then have to retard the read counter 33 until the pulses coincide again. Conversely, if the alignment pulse generator 11a of the first processing chain 8a is instructed by the common digital processor 6 to retard the alignment pulse by one or more cycles, the arrival of the alignment pulse 21a in the FIFO would be retarded by the one or more cycles and the comparator would then have to advanced the read counter 33 until the pulses coincide again.

Moreover, if the rotator 12a rotates the data with respect to the alignment pulses, by a number of samples as described with respect to FIG. 7d, portions of a frame corresponding to the deleted samples would be lost. Moreover, frames that are written into the FIFO while the rotator is adjusted will be malformed. In some cases, data may be written into the FIFO more than once or in other data may be skipped. However, in some embodiments, something will be written to the FIFO every fs/N clock cycle in all cases.

It should be realised that a frame can include any suitable number of samples. The number of samples in each frame can be modified by modifying the repetition rate of the synchronisation pulses and the alignment pulses. Moreover, in some embodiments, the frame rate may be a multiple of the alignment pulse rate and the FIFO may process more than one frame for every alignment pulse received from the alignment pulse generator in the chain. For example, the FIFO may divide the samples between every alignment pulse into two or more frames and the frame delineator data stored in the registers 30 may define the boundaries of the two or more frames. A corresponding number of frame delineating pulses could be generated for each alignment pulse received from the reference alignment pulse generator 14 in order to synchronise the delivery of the frames to the digital processor 6. An alignment pulse may, for example, arrive every 160 cycles but the FIFO may process a new frame every 20 cycles.

Once the data stream in a processing chain is synchronised with the reference alignment pulses, the rotator 12a and the FIFO 13a may be instructed to continue operating with the appropriate delays determined during the synchronisation process and the alignment pulses for that processing chain may turn off. Moreover, if all data streams are synchronised, the FGU 7 may stop transmitting synchronisation pulses. Alternatively, the generation of the synchronisation pulses may be turned off but the alignment pulse generators may continue to generate alignment pulses at intervals which can be adjusted by the common digital processor. Without synchronisation pulses there is no safe alignment window and the alignment pulse generators can be instructed to move the alignment pulses outside the time period which would have been the safe alignment window 22 before the synchronisation pulses were switched off. When required, the FGU 7 and/or the alignment pulse generators 11a, 11b, 14 can start generating pulses again, the rotator 12a, 12b can be instructed to adjust the data set that is chosen for multiplexing and the FIFO 13a, 13b can be instructed to adjust the delay before a particular frame is provided to the common digital processor 6.

The invention allows a plurality of non-synchronous input data streams to be delivered coherently to a digital processor. As mentioned above, any incoherence smaller than a data sample can be adjusted for in the digital common processor. For example, if two data streams are out of synchronisation by 6.25 data samples and the commutator divides the sequence of samples 4-ways, the alignment pulse generator can move the alignment pulse 4 samples corresponding to the number of samples in one cycle of the clock signal $f_s/N$, the rotator can move the data stream 2 sample with respect to the alignment pulse and the common digital processor can adjust for the remaining quarter of a sample by complex weighting.

Whilst specific examples of the invention have been described, the scope of the invention is defined by the appended claims and not limited to the examples. The invention could therefore be implemented in other ways, as would be appreciated by those skilled in the art.

In some embodiments, the coherence of the data streams may be analysed in the common digital processor 6. In other embodiments, the coherence of the data streams may be analysed in another processor and instructions for adjusting the timing of the alignment pulse and the delay by the rotator 12a, 12b may be provided to the common digital processor 6 for forwarding to the alignment pulse generator 11a, 11b and the rotator 12a, 12b. The instructions may alternatively be forwarded directly to the alignment pulse generator 11a, 11b and the rotator 12a, 12b. It is contemplated that if the digital processor 6 is provided on a satellite, the coherence may be analysed in a ground station and instructions may be provided by telecommand to the digital processor 6 and/or the alignment pulse generator 11a, 11b and the rotator 12a, 12b.

It should be realised that the common digital processor and the synchronisation processing arrangement may exchange additional signals not described above. For example, the synchronisation processing arrangement may report information to the common digital processor for monitoring purposes.

Additionally, it should be realised that the components described with respect to FIGS. 1 to 3, 6 and 8 show just one example and many variations are contemplated. For example, some of the described subcomponents can be combined or implemented as a number of separate components. It should be realised that although a single FGU has been described for providing clock signals to all the processing chains and the common digital processor, it should be realised that more than one FGU can be used. Furthermore, where a specific number of chains, data streams and sub-streams have been described, it should be realised that any number of chains, data streams and sub-streams can be used. For example, although an example of the number of sub-streams N equal to 4 has been described, N can be any suitable value. Moreover, although a specific number of registers have been described with respect to the FIFO arrangement, any number of suitable registers can be used.

Additionally, it should be realised that in some embodiments the reference alignment pulse generator may not be needed. Instead, the alignment pulses generated by one of the alignment pulse generators 11a, 11b of the respective processing chains may be used as reference alignment pulses and transmitted to each of the FIFOs 13a, 13b.

Moreover, it should be realised that although the processing chains have been described as operating with the same clock signal rates, the invention could also be used with processing chains having different processing rates.

Furthermore, in some embodiments, instead of providing the same clock signal to all the ADCs of the ADC arrangement, separate clock signals can be provided from one or more FGUs to some or all of the ADCs if suitable. Additionally, in some embodiments, instead of providing the same alignment pulse signal to all the alignment pulse generators, it is contemplated that different alignment pulse signals can be provided to some or all of the alignment pulse generators if suitable.

It should further be realised that although the invention has been described with respect to a communication satellite providing beamforming, the invention can be used for other suitable purposes. The invention can be used in any systems in which separate data streams have to be coherently processed. The invention could for example be used in the processing of radar signals or imaging systems employing sonic, ultrasonic and electromagnetic waves and sonar. The invention can further be used in laboratory instruments. It could also be used in instruments for geophysical exploration. For example, it may be useful in instruments that compare two data streams and where it might be useful to null any phase inaccuracies that might exist in the instrument prior to it being used to perform an analysis.

The invention claimed is:

1. An apparatus for facilitating the alignment of non-synchronous input data streams received in the apparatus, the apparatus comprising:
 an analog to digital converter arrangement for digitizing the plurality of input data streams into a plurality of sequences of samples; and
 a synchronization processing arrangement comprising a processing chain for each data stream;
 wherein each processing chain comprises:
 an alignment pulse generator for generating alignment pulses for the sequence of the plurality of sequences of samples corresponding to the processing chain, and
 a first-in-first-out (FIFO) register arrangement for arranging the sequence of samples with respect to the alignment pulses for the sequence and for synchronizing the delivery of said plurality of sequences of samples to a common processor with respect to the respective alignment pulses; and
 a reference alignment pulse generator, the reference alignment pulse generator configured to generate and transmit reference alignment pulses to the FIFO register arrangement of said processing chains, each FIFO register arrangement configured to output a sequence of samples in an output stream to the common processor such that frame delineator data in the output stream coincide with the receipt of the reference alignment pulses in the FIFO register arrangement.

2. The apparatus according to claim 1, wherein each processing chain has a separate processing chain clock signal and each alignment pulse generator is configured to generate an alignment pulse of the alignment pulses for the sequence at a time determined in accordance with a synchronization pulse common to all processing chains, and received by each alignment pulse generator, and the processing chain clock signal of its respective processing chain.

3. The apparatus according to claim 2, wherein each of said processing chain clock signals has a rate that is N times slower than a sampling rate at which a data stream of the plurality of data streams is sampled and each processing chain further comprises means for dividing each sequence of samples corresponding to a data stream into a plurality (N) sub-streams such that N samples are processed in each cycle of the processing chain clock signal.

4. The apparatus according to claim 3, wherein each alignment pulse generator is operable to adjust the timing of an alignment pulse for the sequence of samples with respect to an earlier alignment pulse for the sequence of samples to move said alignment pulse one or more cycles of the processing chain clock signal, corresponding to steps of N samples of the sequence of samples, in order to align the non-synchronous input data streams.

5. The apparatus according to claim 3, wherein the plurality of alignment pulses provide a plurality of frame boundaries and each processing chain further comprising a means for moving the sequence of samples with respect to the plurality of alignment pulses to align the non-synchronous input data streams, the means for moving being configured to move the sequence of samples between 0 and N−1 samples with respect to the plurality of frame boundaries.

6. The apparatus according to claim 5, wherein the FIFO register arrangement is configured to receive said sequence of samples and said alignment pulses and arrange the sequence of samples into frames in accordance with the alignment pulse in one or more registers, and the FIFO register arrangement is further arranged to deliver the samples from the register arrangement to the common processor after a configurable delay such that data samples from different processing chains having corresponding positions within corresponding frames are delivered to the common processor synchronously.

7. The apparatus according to claim 2, wherein the synchronization pulse comprises a pulse of a predetermined width, each alignment pulse generator being configured to sample said pulse and create an alignment pulse within a time interval corresponding to said predetermined width.

8. The apparatus according to claim 2, wherein the apparatus further comprises a synchronization pulse generator for transmitting said synchronization pulse to each of the processing chains.

9. The apparatus according to claim 1, further comprising:
 a plurality of receive antenna feeds for receiving said data streams; and
 a common digital processor configured to receive said plurality of sequences of samples from the synchronization processing arrangement.

10. A satellite payload comprising the apparatus of claim 1.

11. A method for facilitating alignment of non-synchronous input data streams received by an apparatus, comprising:
 digitizing said data streams into a plurality of sequences of samples by an analog to digital converter arrangement;
 synchronizing, by a synchronization processing arrangement comprising a processing chain for each data stream;
 generating alignment pulses for each sequence of samples by an alignment pulse generator;
 arranging each sequence of samples with respect to its corresponding alignment pulses by a first-in-first-out (FIFO) register arrangement;
 and synchronizing the delivery of each sequence of samples to a common digital processor with respect to the alignment pulses for the sequences; and
 generating and transmitting, by a reference alignment pulse generator, reference alignment pulses to the FIFO register arrangement of said processing chains, each FIFO register arrangement configured to output a sequence of samples in an output stream to the common digital processor such that frame delineator data in the output stream coincide with the receipt of the reference alignment pulses in the FIFO register arrangement.

12. The method according to claim 11, wherein arranging each sequence of samples with respect to its corresponding alignment pulses comprises receiving the sequence of samples of the plurality of sequence of samples and the alignment pulses for said sequence and arranging the sequence of samples into frames in accordance with the alignment pulses in one or more registers and wherein synchronizing the delivery of each sequence comprises extracting the sequence of samples from the one or more registers after a configurable delay such that data samples of different sequences of samples having corresponding positions within corresponding frames are delivered to the common processor synchronously.

13. The method according to claim 11, wherein arranging each sequence of samples further comprises adjusting the position of alignment pulses relative to the samples in the sequence of samples to ensure that corresponding data samples are arranged in corresponding position with respect to respective alignment pulses in the plurality of sequences, wherein each sequence of samples is processed as a number of N sub-streams, N samples being processed at each clock cycle, and wherein adjusting the position of alignment pulses relative to the samples comprises adjusting the timing of an alignment pulse one or more clock cycles to move the alignment pulse N data samples and using a data selector to introduce a delay in the processing of the samples to move the sequence of samples a number of samples between 0 and N−1 samples with respect to the alignment pulses.

* * * * *